(12) United States Patent
Philipp

(10) Patent No.: US 9,864,261 B2
(45) Date of Patent: Jan. 9, 2018

(54) ELECTRONIC DEVICE INCLUDING PICO PROJECTOR AND OPTICAL CORRECTION SYSTEM

(71) Applicant: STMicroelectronics International N.V., Amsterdam (NL)

(72) Inventor: Tzvi Philipp, Bet Shemesh (IL)

(73) Assignee: STMicroelectronics LTD, Netanya (IL)

( * ) Notice: Subject to any disclaimer, the term of this patent is extended or adjusted under 35 U.S.C. 154(b) by 40 days.

(21) Appl. No.: 14/584,080

(22) Filed: Dec. 29, 2014

(65) Prior Publication Data
US 2016/0187765 A1  Jun. 30, 2016

(51) Int. Cl.
| | |
|---|---|
| G03B 21/14 | (2006.01) |
| H04N 9/31 | (2006.01) |
| G02B 26/08 | (2006.01) |
| G02B 17/08 | (2006.01) |
| G03B 21/28 | (2006.01) |
| G02B 27/00 | (2006.01) |

(52) U.S. Cl.
CPC ....... *G03B 21/147* (2013.01); *G02B 17/0852* (2013.01); *G02B 17/0896* (2013.01); *G02B 26/0816* (2013.01); *G02B 27/0068* (2013.01); *G03B 21/142* (2013.01); *G03B 21/28* (2013.01); *H04N 9/317* (2013.01); *H04N 9/3173* (2013.01)

(58) Field of Classification Search
CPC .... G03B 21/142; G03B 21/147; G03B 21/14; G03B 21/30; G03B 21/28; H04N 9/3176; H04N 9/317

USPC .......................................................... 353/82
See application file for complete search history.

(56) References Cited

U.S. PATENT DOCUMENTS

| | | | |
|---|---|---|---|
| 8,558,937 B2 | 10/2013 | Park et al. | |
| 2005/0243288 A1* | 11/2005 | Wu | H04N 9/3105 353/97 |
| 2012/0154663 A1* | 6/2012 | Park | G03B 17/54 348/333.06 |

OTHER PUBLICATIONS

First Office Action and Search Report from co-pending CN Appl. No. 201510587733.4 (6 pages).

* cited by examiner

*Primary Examiner* — Ryan Howard
(74) *Attorney, Agent, or Firm* — Gardere Wynne Sewell LLP

(57) ABSTRACT

An electronic device includes a movable mirror system to selectively reflect an incident image projection beam traveling along a first path toward a second path different than a first path. The image projection beam displays a corrected image at a first location but would otherwise display an uncorrected image at a second location when the movable mirror system reflects the image projection beam toward the second path. The electronic device also includes an optical correction system having at least one corrective optic element to correct the image projection beam to display a corrected image at the second location when the movable mirror system reflects the image projection beam toward the second path.

15 Claims, 10 Drawing Sheets

ELECTRONIC DEVICE INCLUDING PICO PROJECTOR AND OPTICAL CORRECTION SYSTEM

TECHNICAL FIELD

This disclosure herein is directed to the field of handheld image projector technology.

BACKGROUND

Handheld projectors, also known as mobile projectors, pico projector units, or mini beamers, are handheld electronic devices that facilitate easy and convenient projection of images onto viewing surfaces. In addition to handheld projectors, similar functionality is being incorporated into smartphones, tablets, and digital cameras.

A typical handheld projector includes a battery, electronics responsible for image storage and playback and different color light sources. In operation, the electronics turn the stored images into electronic signals. Next, the electronic signals drive light sources with different colors and intensities to form an image on a projection surface. A commercially desirable characteristic of a handheld projector is the ability to project a clear image, regardless of the operating conditions.

Unfortunately, the angle at which the device is to be held with respect to a viewing surface, or the distance at which the device is to be held from the viewing surface, is often constrained due to technical limitations. Indeed, if such devices are used outside of such constraints, the images projected may be distorted and/or unfocused, resulting in consumer dissatisfaction.

So as to provide consumers capable of projecting a clear image under a wide variety of conditions, further development of such handheld projector technology is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device includes a movable mirror system configured to selectively reflect an incident image projection beam traveling along a first path toward a second path different than a first path. The image projection beam is configured to display a corrected image at a first location but would otherwise display an uncorrected image at a second location when the movable mirror system reflects the image projection beam toward the second path. The electronic device also includes an optical correction system having at least one corrective optic element configured to correct the image projection beam and display a corrected image at the second location when the movable mirror system reflects the image projection beam toward the second path.

The movable mirror system may have a mirror and an actuator associated with the mirror to selectively move the mirror into the first path such that the mirror reflects the image projection beam toward the second path.

The movable mirror system may be further configured to selectively reflect the image projection beam toward a third path different than the first path and second path for display at the first location.

The movable mirror system may include a mirror and an actuator associated with the mirror to move the mirror between a first position and a second position, with the mirror configured to reflect the image projection beam toward the third path when in the first position and configured to reflect the image projection beam toward the second path when in the second position.

The movable mirror system may be further configured to selectively reflect the image projection beam toward a fourth path different than the first path and second path. In addition, the image projection beam may be configured to display an uncorrected image at a third location different than the first location and second location when the movable mirror system reflects the image projection beam toward the third path. The at least one corrective optic element may include a first corrective optic element configured to correct the image projection beam such that the corrected image is displayed at the second location when the movable mirror system reflects the image projection beam toward the second path. A second corrective optic element may be configured to correct the image projection beam such that a corrected image is displayed at the third location when the movable mirror system reflects the image projection beam toward the fourth path.

The at least one corrective optic element may include a lens fixably mounted in the electronic device along the second path.

The optical correction system may include at least one actuator to selectively move the at least one corrective optic element into the second path.

The at least one corrective optic element may have a first corrective optic element and a second corrective optic element. The optical correction system may also include a first actuator to selectively move the first corrective optic element into the second path and a second actuator to selectively move the second corrective optic element into the second path.

The at least one corrective optic element may include a lens constructed from one of plastic and glass.

The at least one corrective optic element may include a lens having one of a spherical shape, aspherical shape, polynomial shape, and a free form shape.

The first path may be at a first angle with respect to a longitudinal axis of the electronic device, and the second path may be at a second angle with respect to the longitudinal axis of the electronic device different than the first angle.

The first location may be at a first distance from the electronic device, and the second location may be at a second distance from the electronic device different than the first distance.

The first path may be at a first incident angle with respect to the first location, and the second path may be at a second incident angle with respect to the second location different than the first incident angle.

Another aspect is directed to an electronic device that includes a pico projector configured to project an image projection beam along a first path. The electronic device also includes a movable mirror system configured to selectively reflect the image projection beam toward a second path different than the first path, with the first path having a first angle with respect to a longitudinal axis of the handheld housing, and with the second path having a second angle with respect to the longitudinal axis of the handheld housing different than the first angle. The pico projector generates the image projection beam such that a corrected image is displayable at a first location, and such that an uncorrected image would otherwise be displayed at a second location when the movable mirror system reflects the image projection beam toward the second path, with the first location being at a first distance from the handheld housing, and with the second location being at a second distance from the handheld housing different than the first distance. The electronic device also includes an optical correction system having at least one corrective optic element configured to correct the image projection beam such that a corrected image is displayed at the second location when the movable mirror system reflects the image projection beam toward the second path.

A method aspect includes generating an image projection beam, using a pico projector. The method aspect also includes selectively reflecting the image projection beam toward one of a first path and a second path different than the first path, using a movable mirror system. The image projection beam is corrected such that a corrected image is displayed at a first location when the image projection beam is reflected toward the first path, using a first corrective optic element of an optical correction system. The image projection beam is corrected such that a corrected image is displayed at a second location different than the first location when the image projection beam is reflected toward the second path, using a second corrective optic element of the optical correction system.

DETAILED DESCRIPTION

Figure 1A:
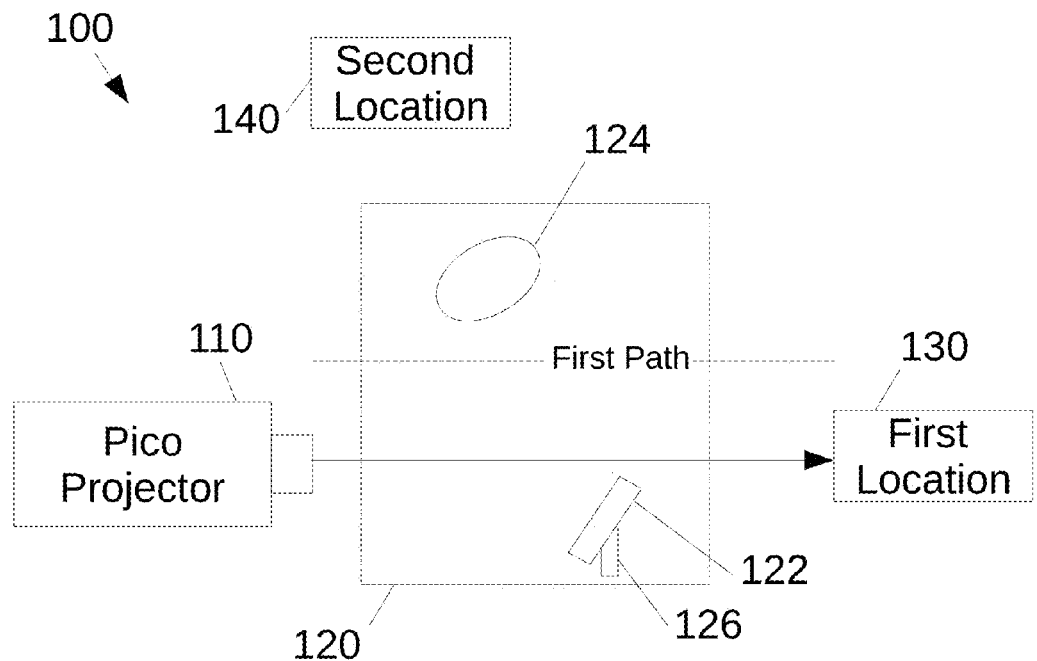
FIG. 1A is a schematic block diagram of an electronic device in which a mirror allows an image projection beam to pass along its initial path.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout.

Figure 1B:
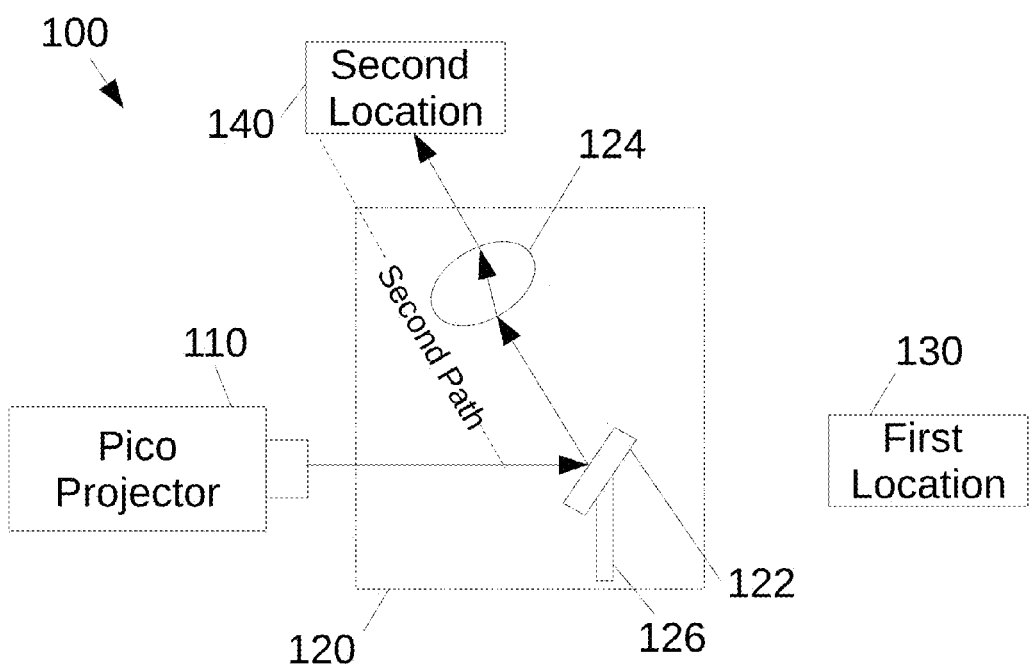
FIG. 1B is a schematic block diagram of the electronic device of FIG. 1A in which the mirror is reflecting the image projection beam toward a second path which includes an optical element.

With initial reference to FIGS. 1A-1B, an electronic device 100 is now described. The electronic device 100 may be a handheld projector unit, digital camera, smartphone, tablet, smartwatch, or any other device for which the capability of projecting images onto a viewing surface may be useful or desirable.

The electronic device 100 includes a pico projector 110, which combines multiple beams of collimated light to produce an image projection beam that, when striking a viewing surface, produces viewable images. Such a pico projector 110 is known in the art, and thus further descriptions thereof are omitted for brevity. The electronic device 110 also includes a system 120 for acting upon the image projection beam, for example by reflecting the image projection beam or optically correcting the image projection beam.

The system 120 includes an optical correction system that includes an optical element 124 for optical correction of the image projection beam, and a movable mirror system that includes a mirror 122, with a mirror actuator 126 for adjusting the angle of the mirror 122 and/or the position of the mirror 122 within the system 120.

The optical element 124 is a lens of suitable shape, constructed from suitable materials. For example, the lens may be convex or concave, and may have a spherical shape, aspherical shape, polynomial shape, free form shape, or other useful shape, and may be constructed from plastic, glass, or other material with the desired optical properties.

The mirror 122 may be constructed from any suitable material, and may take any suitable shape. The mirror actuator 126 may be any combination of servomotors, motors, pistons, and other suitably sized components.

Operation of the electronic device 100 is now described. The pico projector 110 generates the image projection beam, which travels along a first path. The first path terminates at the viewing surface of the first location 130. The pico projector 110 is tuned such that the image produced at the first location, if and when the first location is struck by the image projection beam, is corrected. When the term corrected is used here, it is meant that the image appears focused, sharp, and undistorted to viewers.

As shown in FIG. 1A, the mirror 122 is positioned out of the first path by the mirror actuator 126. In this operation mode, the image projection beam travels unimpeded along the first path until it reaches the viewing surface of the first location 130, onto which it displays the corrected image.

However, as shown in FIG. 1B, the mirror 122 may be positioned within the first path by the mirror actuator 126, and therefore reflect the incident image projection beam striking it. The image projection beam is reflected toward and along a second path which ultimately terminates at the viewing surface of the second location 140. However, the distance from the pico projector 110 to the first location 130 is different than the distance from the pico projector 110 to the second location 140. That is, the length of the first path is different than the length of the second path, allowing for the electronic device 100 to be used at different distances from viewing surfaces. In addition, the incident angle at which the image projection beam strikes the viewing surface of the first location is different than the incident angle at which the image projection beam strikes the viewing surface of the second location. Furthermore, the first path is at a different angle with respect to the longitudinal axis of the electronic device 100 than the second path.

Therefore, due to one or more of these differences, while the image projection beam, as generated, produces a corrected image at the first location 130, it does not produce a corrected image at the second location 140, due to the factors described above.

The optical element 124 is thus positioned along the second path, and serves to correct the image projection beam as it passes along the second path on its way to the second location 140. Consequently, due to the optical element 124, a corrected image is displayed at the second location 140 when the mirror reflects the image projection beam along the second path.

Figure 5:
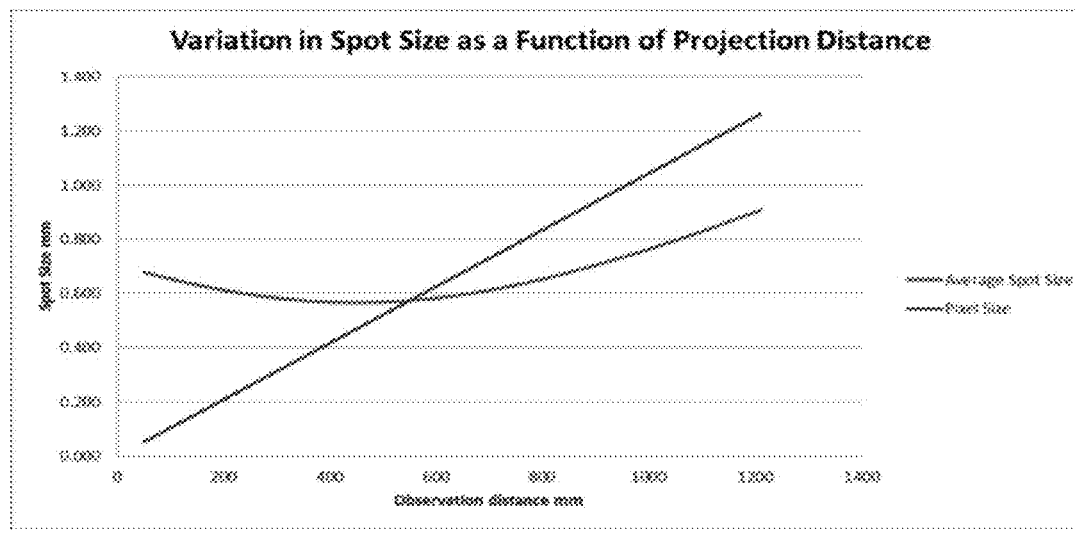
FIG. 5 is a graph showing the variation in size of the image formed by the electronic device of this disclosure as a function of the distance between the projector and the viewing surface.
Figure 6:
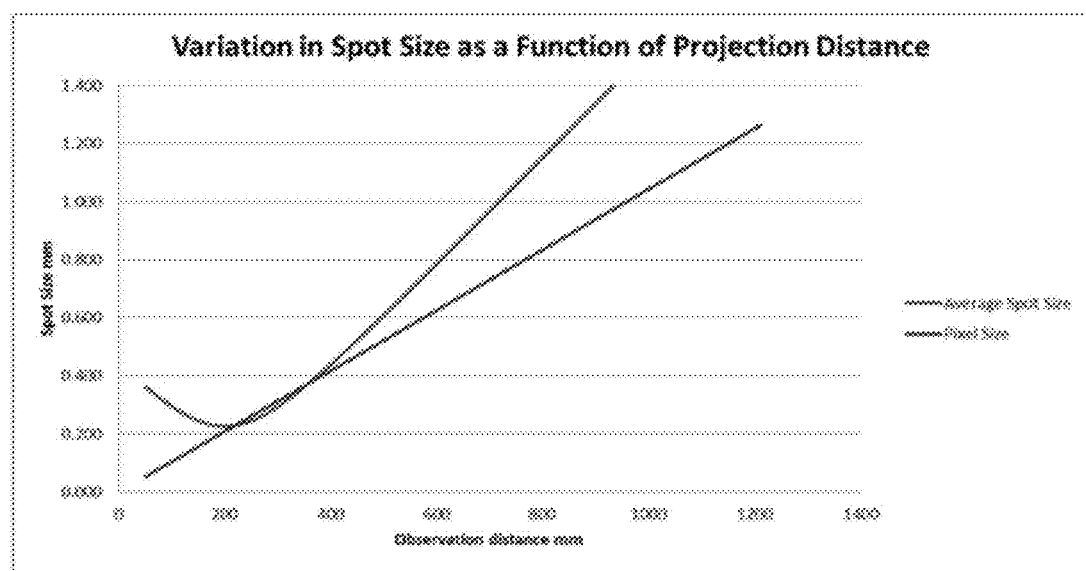
FIG. 6 is a graph showing the variation in size of the image formed by the electronic device of this disclosure, with an optical element in use, as a function of the distance between the projector and the viewing surface
Figure 7A:
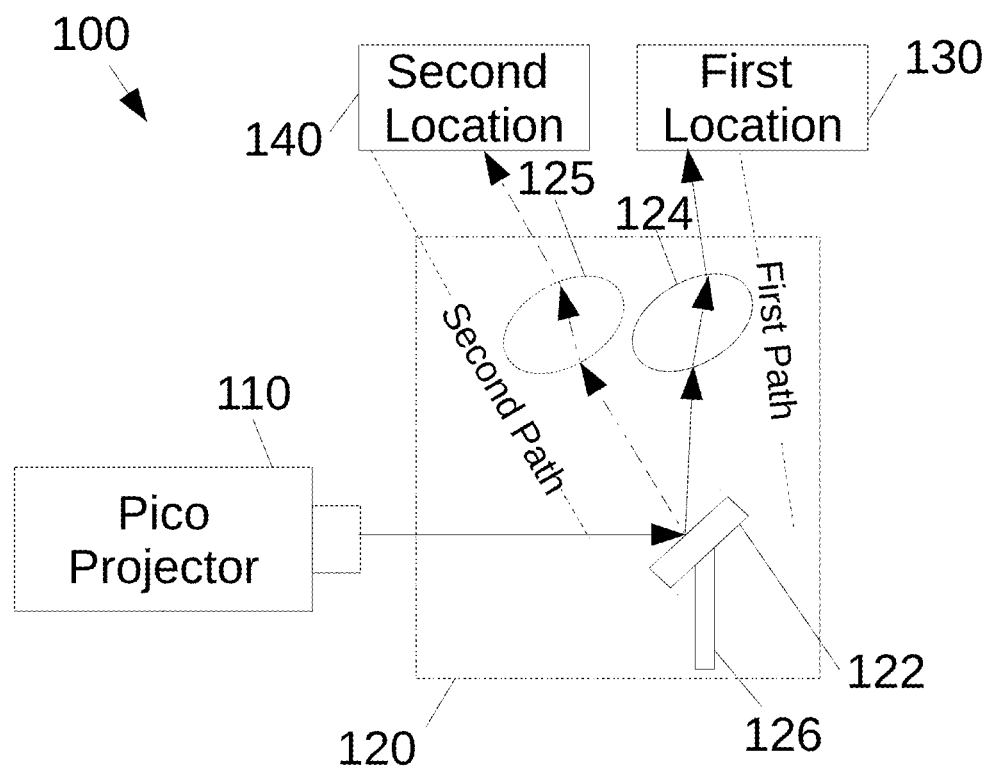
FIG. 7A is a schematic block diagram of an electronic device in which a mirror is reflecting an image projection beam toward a first path which includes a first optical element.
Figure 7B:
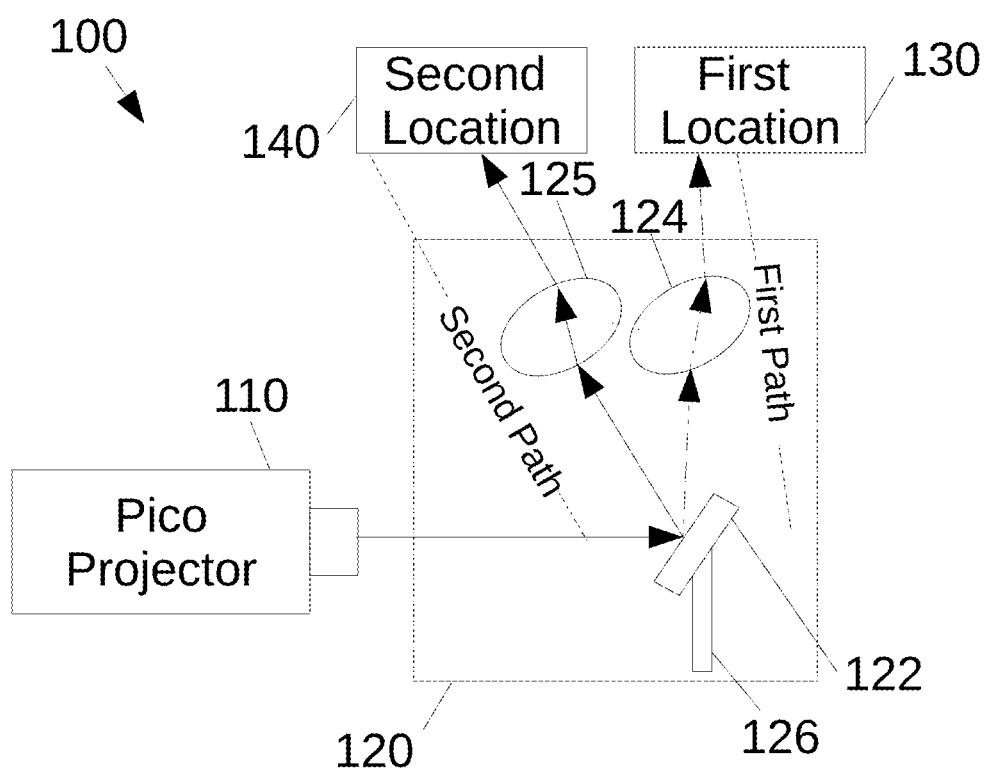
FIG. 7B is a schematic block diagram of an electronic device in which a mirror is reflecting an image projection beam toward a second path which includes a second optical element.
Figure 7C:
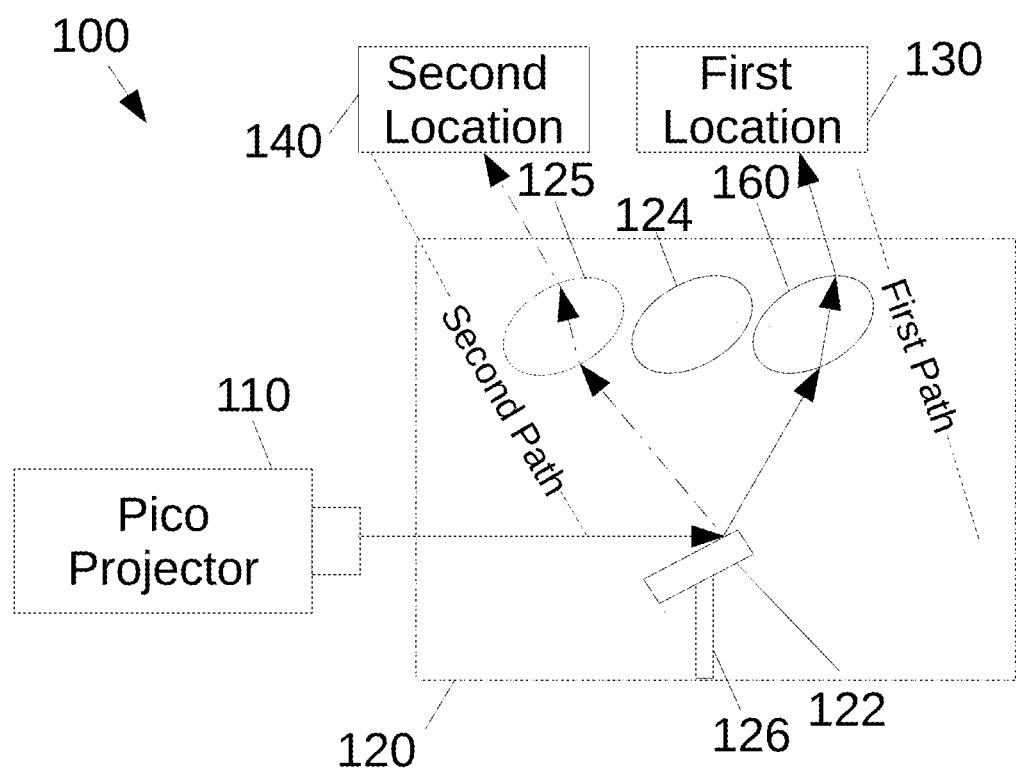
FIG. 7C is a schematic block diagram of an electronic device in which a mirror is reflecting an image projection beam toward a first path which includes a third optical element.
Figure 7D:
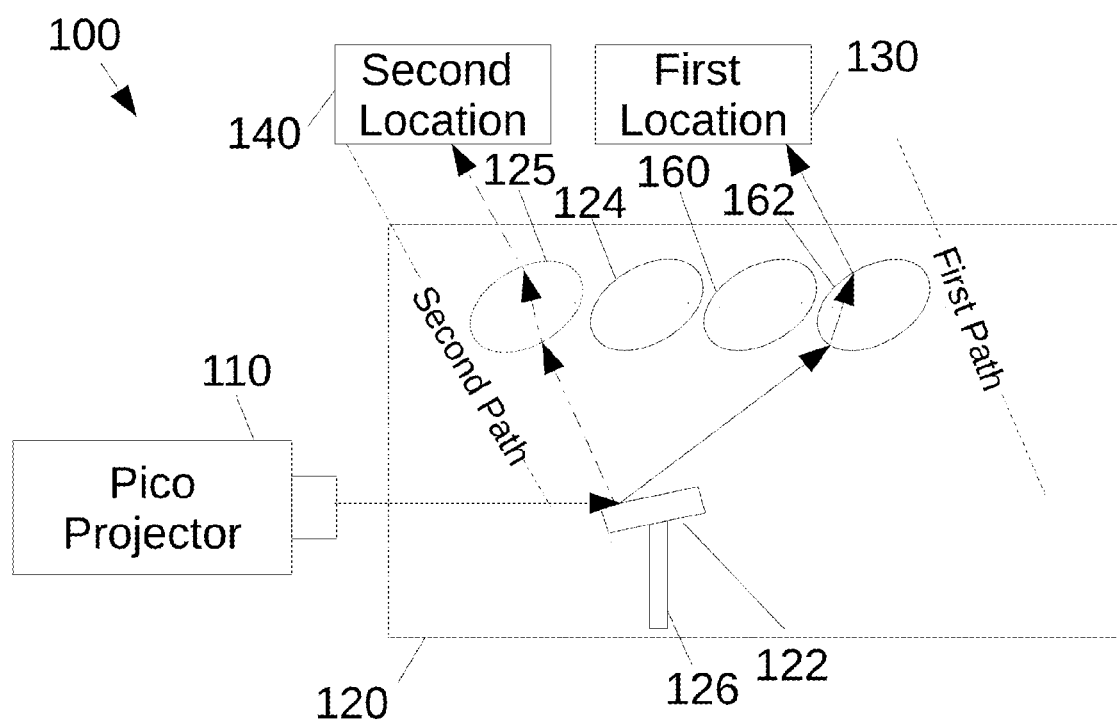
FIG. 7D is a schematic block diagram of an electronic device in which a mirror is reflecting an image projection beam toward a first path which includes a fourth optical element.

Correction of the image projection beam is now described in detail with additional reference to FIGS. 5 and 6. The curved line on these graphs represents the size of one of the components of the image projection beam as it appears when striking a viewing surface, while the straight line represents the size of each pixel to be used in order for the image to appear clear and sharp to a viewer.

Consequently, it is evident that the point or points where the two lines intersect is the point at which the size of the spot formed by a component of the image projection beam as it strikes the viewing surface equals the size of each pixel to be used in order for the image to appear sharp and clear. At the points where the spot size of the curved line are greater than the spot size of the straight line, image quality would be poor as the pixels would not be correctly resolved. At the points where the spot size of the curved line are less than the spot size of the straight line, individual pixels of the image could appear spaced from one another, likewise causing a poor image.

As can be seen in FIG. 5, a suitable observation distance for the first path, for example, is between 400 mm and 800 mm, such that the resulting image quality is not poor. However, a closer observation distance may be desired. With the optical element 124 in place, the curved line is shifted, thus making a suitable observation distance for the second path be between 200 mm and 400 mm, as shown in FIG. 6.

Figure 2A:
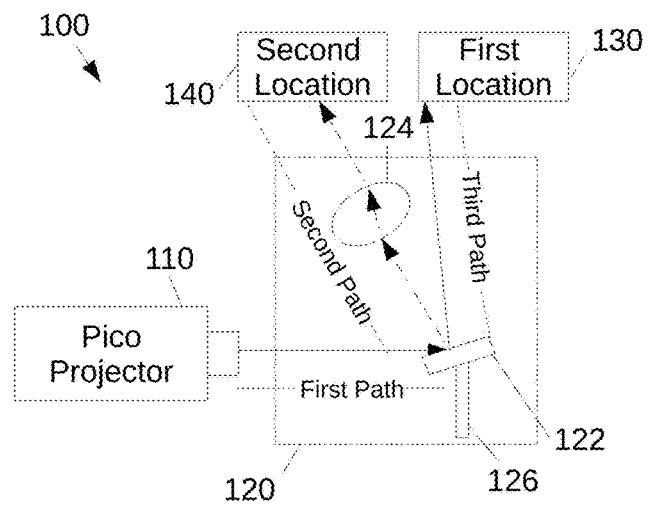
FIG. 2A is a schematic block diagram of an electronic device in which a mirror is reflecting an image projection beam toward a third path.

Another embodiment is shown in FIG. 2A. Here, the first path does not ultimately terminate at the first location 130. Rather, the mirror actuator 126 adjusts the mirror 122 such that the image projection beam is reflected toward a third path that terminates at the first location 130. This arrangement may be desirable in some applications, as the mirror 122 is tilted along an axis by the mirror actuator 126, as opposed to being extended or retracted within the system 120.

Figure 2B:
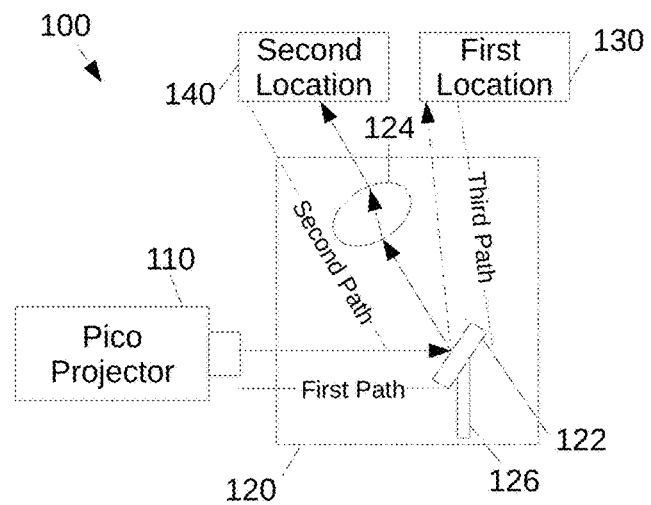
FIG. 2B is a schematic block diagram of the electronic device of FIG. 2A in which the mirror is reflecting the image projection beam toward a second path which includes an optical element.

It logically follows that the mirror actuator 126, may adjust the mirror 122 such that the image projection beam is instead reflected toward the second path, through the optical element 124, and onto the viewing surface of the second location 140, as shown in FIG. 2B.

Figure 3A:
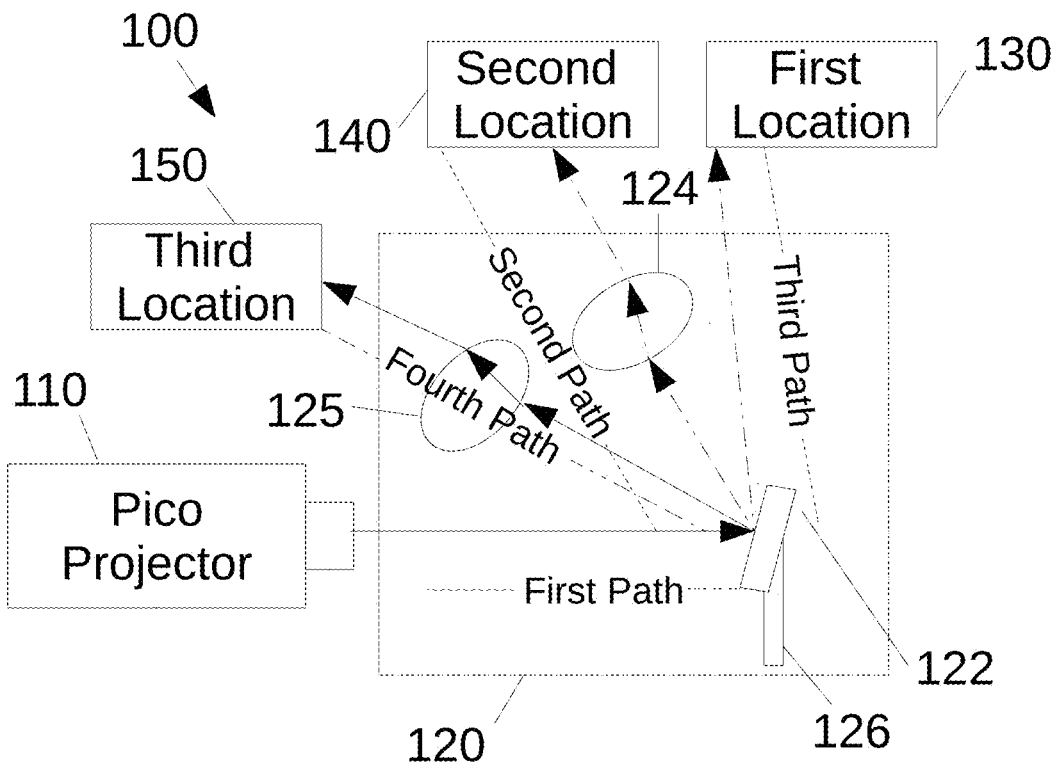
FIG. 3A is a schematic block diagram of an electronic device in which a mirror is reflecting an image projection beam toward a fourth path which includes an optical element.

In yet further embodiments, the electronic device 100 may be capable of use at three or more locations with different use case parameters. Such an embodiment is shown in FIG. 3A. Here, the mirror actuator 126 is capable of selectively reflecting the image projection beam toward a second path, third path, and fourth path. The pico projector 110 projects the image projection beam such that an uncorrected image would, absent modification via an optical element, otherwise be displayed at the second location 140 or third location 150. However, the system 120 here includes multiple optical elements 124, 125 that correct the image projection beam as it passes along the second path or fourth path, respectively. Thus, a corrected image is displayed on the viewing surface of the second location 140 or third location 150. Also similarly as above, the pico projector 110 is configured such that an optical element is not used when the image projection beam is to be reflected toward the third path, as in this case the pico projector 110 is properly configured so that the projection beam produces a corrected image at the first location 130.

Figure 3B:
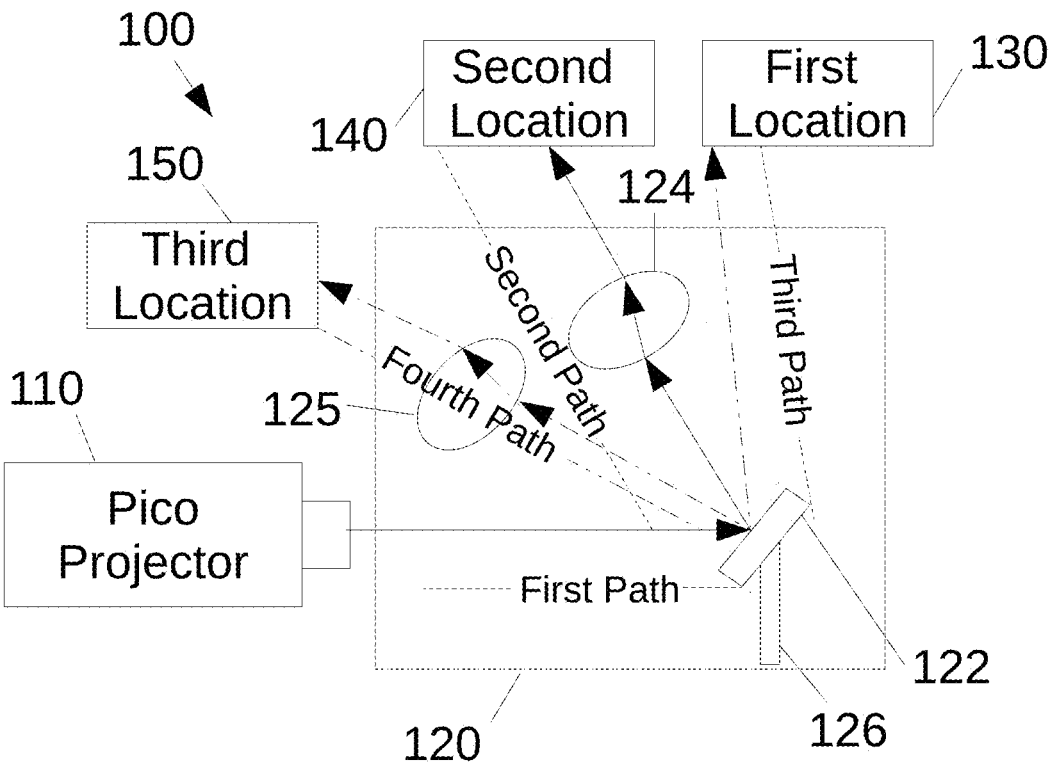
FIG. 3B is a schematic block diagram of the electronic device of FIG. 3A in which the mirror is reflecting the image projection beam toward a second path which includes an optical element.
Figure 3C:
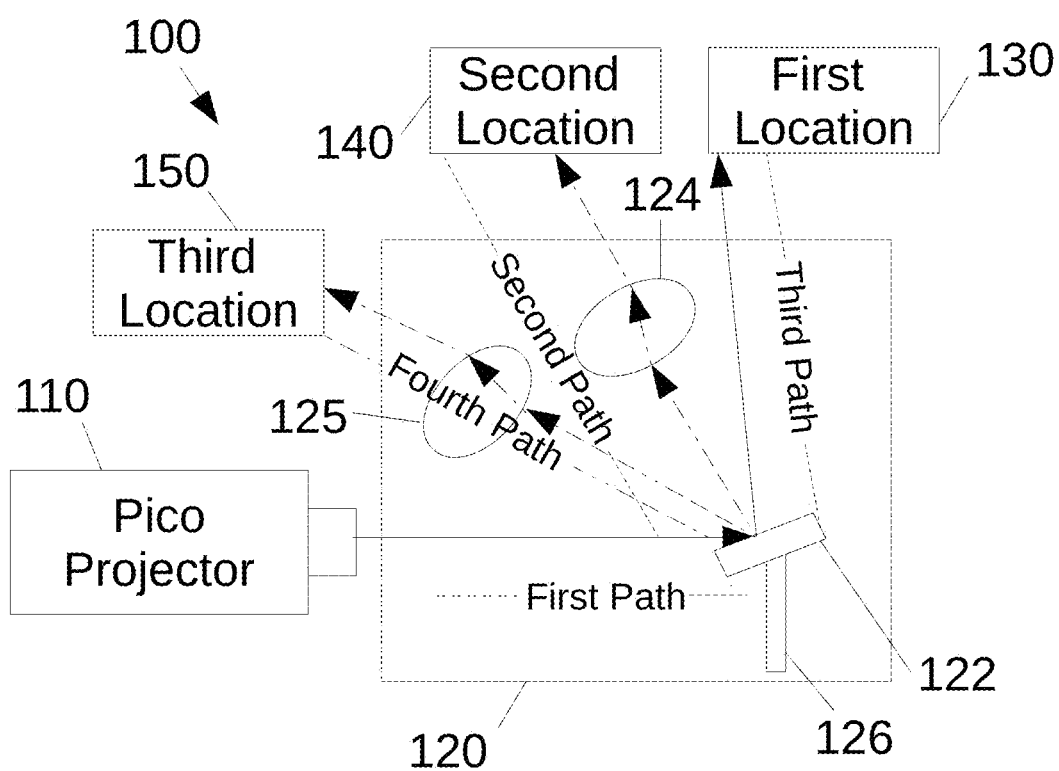
FIG. 3C is a schematic block diagram of the electronic device of FIG. 3A in which the mirror is reflecting the image projection beam toward a third path.

A sample use case where the mirror actuator 126 is tilting the mirror 122 such that the image projection beam travels along the second path, as opposed to the fourth path, is shown in FIG. 3B. Another sample use case where the mirror actuator 126 is tilting the mirror 122 such that the image projection beam travels along the third path, as opposed to the second path or fourth path, is shown in FIG. 3C.

In the applications described above, the optic elements 124, 125 are fixably mounted in the electronic device 100 along the respective paths on which they are to act. In some cases, however, it may be useful to be able to use different optical elements for a given path.

Figure 4A:
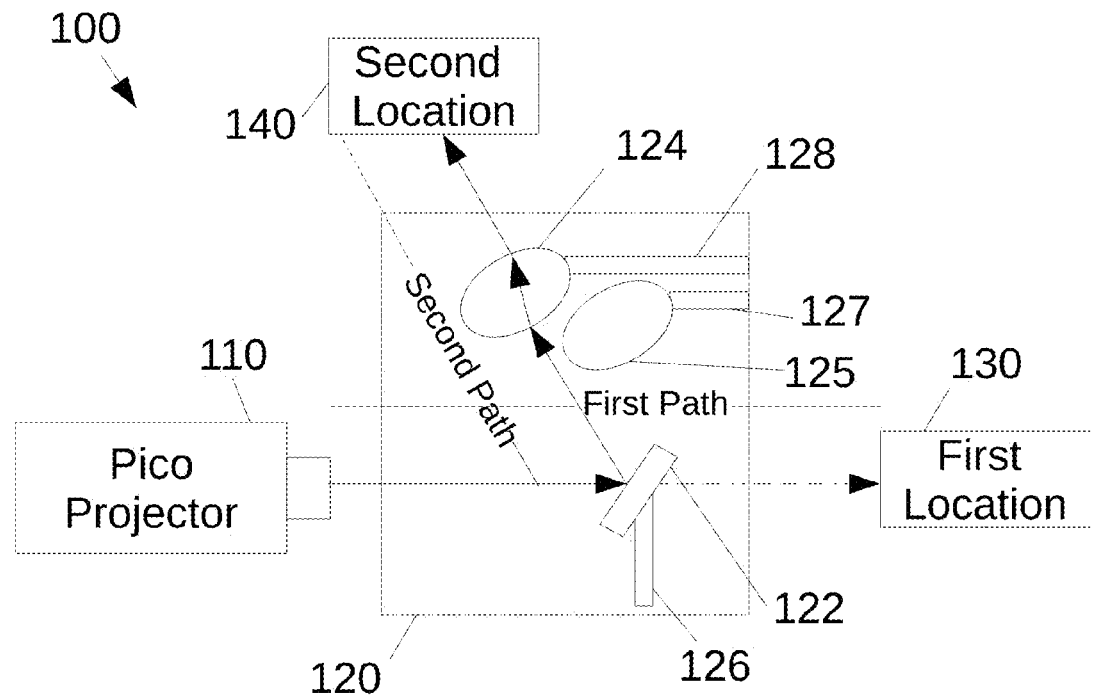
FIG. 4A is a schematic block diagram of an electronic device in which a mirror is reflecting an image projection beam toward a second path which includes a first optical element.

Such an application is shown in FIG. 4A, where a first optical element 124 is mounted to a first optical element actuator 128. The optical element actuator 128 may be any combination of servomotors, motors, pistons, and other suitably sized components.

Figure 4B:
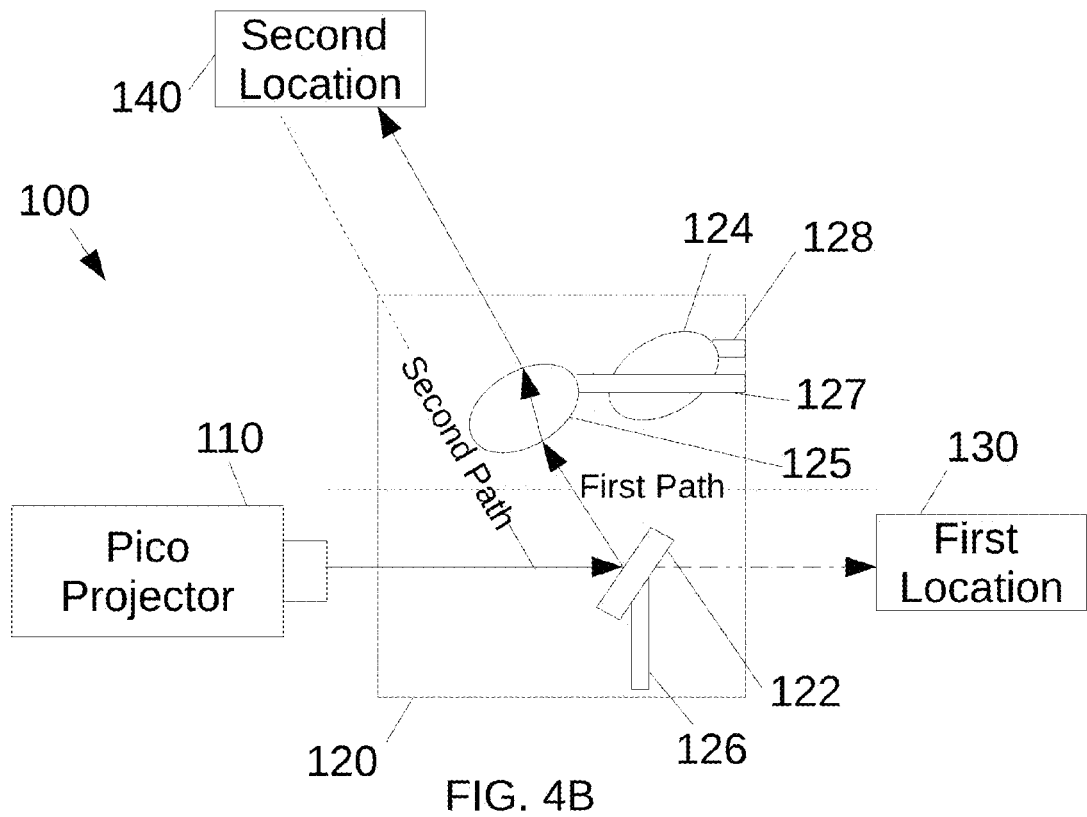
FIG. 4B is a schematic block diagram of the electronic device of FIG. 4A in which the mirror is reflecting the image projection beam toward the second path, which includes a second optical element instead of the first optical element.

As illustrated, the first optical element actuator 128 has moved the first optical element 124 such that it is in the second path. If desired, as shown in FIG. 4B, the first optical element actuator 128 can retract the first optical element 124 such that it is no longer in the second path, and the second optical element actuator 127 can move the second optical element 125 into the second path. This may be desirable in situations where the length of the second path, and thus the distance between the electronic device 100 and the viewing surface at the second location 140, is changed while other operating parameters remain similar or the same. Another situation in which this functionality may be desirable is when the incident angle between the image projection beam and the viewing surface at the second location 140 has changed.

Also disclosed herein, with reference to FIGS. 7A-7D, is a method including generating an image projection beam using a pico projector 110, selectively reflecting the image projection beam toward one of a first path and a second path different than the first path, using a movable mirror system 122, 126. The method further includes correcting the image projection beam such that a corrected image is displayed at a first location 130 when the image projection beam is reflected toward the first path, using a first corrective optic element 124 of an optical correction system. The method additionally includes correcting the image projection beam such that a corrected image is displayed at a second location 140 different than the first location 130 when the image projection beam is reflected toward the second path, using a second corrective optic element 125 of the optical correction system.

The method may include changing a distance between the first location 130 and the pico projector 110, and correcting the image projection beam such that a corrected image is displayed at the first location 130 when the image projection beam is reflected toward the first path, using a third corrective optic 160 element of the optical correction system.

The method may include changing an incident angle between the first location 130 and the image projection beam, and correcting the image projection beam such that a corrected image is displayed at the first location 130 when the image projection beam is reflected toward the first path, using a fourth corrective optic element 162 of the optical correction system.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device comprising:
   a movable mirror system configured to selectively reflect an incident image projection beam traveling along a first path toward a second path different than a first path;
   wherein the image projection beam is configured to display a corrected image at a first location but would otherwise display an uncorrected image at a second location when the movable mirror system reflects the image projection beam toward the second path; and
   an optical correction system having at least one corrective optic element configured to correct the image projection beam and display a corrected image at the second location when the movable mirror system reflects the image projection beam toward the second path;
   wherein the movable mirror system is further configured to selectively reflect the image projection beam toward a third path different than the first path and second path;
   wherein the image projection beam is configured to display an uncorrected image at a third location different than the first location and second location when the movable mirror system reflects the image projection beam toward the third path; and
   wherein the at least one corrective optic element comprises:
      a first corrective optic element configured to correct the image projection beam such that the corrected image is displayed at the second location when the movable mirror system reflects the image projection beam toward the second path, and
      a second corrective optic element configured to correct the image projection beam such that a corrected image is displayed at the third location when the movable mirror system reflects the image projection beam toward the third path.

2. The electronic device of claim 1, wherein the movable mirror system comprises a mirror and an actuator associated with the mirror to selectively move the mirror into the first path such that the mirror reflects the image projection beam toward the second path.

3. The electronic device of claim 2, wherein the actuator associated with the mirror further operates to move the mirror between a first position and a second position, the mirror configured to reflect the image projection beam toward the third path when in the first position and configured to reflect the image projection beam toward the second path when in the second position.

4. The electronic device of claim 1, wherein the at least one corrective optic element comprises a lens fixably mounted in the electronic device along the second path.

5. The electronic device of claim 1, wherein the at least one corrective optic element comprises a lens constructed from one of plastic and glass.

6. The electronic device of claim 1, wherein the at least one corrective optic element comprises a lens having one of a spherical shape, aspherical shape, polynomial shape, and a free form shape.

7. The electronic device of claim 1, wherein the first path is at a first angle with respect to a longitudinal axis of the electronic device; and wherein the second path is at a second angle with respect to the longitudinal axis of the electronic device different than the first angle.

8. The electronic device of claim 1, wherein the first location is at a first distance from the electronic device; and wherein the second location is at a second distance from the electronic device different than the first distance.

9. The electronic device of claim 1, wherein the first path is at a first incident angle with respect to the first location; and wherein the second path is at a second incident angle with respect to the second location different than the first incident angle.

10. An electronic device comprising:
    a movable mirror system configured to selectively reflect an incident image projection beam traveling along a first path toward a second path different than a first path;
    wherein the image projection beam is configured to display a corrected image at a first location but would otherwise display an uncorrected image at a second location when the movable mirror system reflects the image projection beam toward the second path; and
    an optical correction system having at least one corrective optic element configured to correct the image projection beam and display a corrected image at the second location when the movable mirror system reflects the image projection beam toward the second path;

wherein the optical correction system further comprises at least one actuator to selectively move the at least one corrective optic element into the second path.

11. An electronic device comprising:
a movable mirror system configured to selectively reflect an incident image projection beam traveling along a first path toward a second path different than a first path;
wherein the image projection beam is configured to display a corrected image at a first location but would otherwise display an uncorrected image at a second location when the movable mirror system reflects the image projection beam toward the second path; and
an optical correction system having at least one corrective optic element configured to correct the image projection beam and display a corrected image at the second location when the movable mirror system reflects the image projection beam toward the second path;
wherein the at least one corrective optic element comprises a first corrective optic element and a second corrective optic element; and
wherein the optical correction system further comprises a first actuator to selectively move the first corrective optic element into the second path and a second actuator to selectively move the second corrective optic element into the second path.

12. An electronic device comprising:
a pico projector within a handheld housing and configured to project an image projection beam along a first path;
a movable mirror system within the handheld housing and configured to selectively reflect the image projection beam toward a second path different than the first path, the first path having a first angle with respect to a longitudinal axis of the handheld housing, the second path having a second angle with respect to the longitudinal axis of the handheld housing different than the first angle;
wherein the pico projector generates the image projection beam such that a corrected image is displayable at a first location, and such that an uncorrected image would otherwise be displayed at a second location when the movable mirror system reflects the image projection beam toward the second path, the first location being at a first distance from the handheld housing, the second location being at a second distance from the handheld housing different than the first distance; and
an optical correction system having at least one corrective optic element configured to correct the image projection beam such that a corrected image is displayed at the second location when the movable mirror system reflects the image projection beam toward the second path;
wherein the movable mirror system is further configured to selectively reflect the image projection beam toward a third path different than the first path and second path;
wherein the pico projector generates the image projection beam such that an uncorrected image would otherwise be displayed at a third location different than the first location and second location when the movable mirror system reflects the image projection beam toward the third path; and
wherein the at least one corrective optic element comprises:
a first corrective optic element configured to correct the image projection beam such that the corrected image is displayed at the second location when the movable mirror system reflects the image projection beam toward the second path, and
a second corrective optic element configured to correct the image projection beam such that a corrected image is displayed at the third location when the movable mirror system reflects the image projection beam toward the third path.

13. The electronic device of claim 12, wherein the movable mirror system comprises a mirror and an actuator associated with the mirror to move the mirror between a first position and a second position, the mirror when in the first position reflecting the image projection beam toward the third path and when in the second position reflecting the image projection beam toward the second path.

14. A method comprising:
generating an image projection beam, using a pico projector;
selectively reflecting the image projection beam toward one of a first path and a second path different than the first path, using a movable mirror system;
correcting the image projection beam such that a corrected image is displayed at a first location when the image projection beam is reflected toward the first path, using a first corrective optic element of an optical correction system;
correcting the image projection beam such that a corrected image is displayed at a second location different than the first location when the image projection beam is reflected toward the second path, using a second corrective optic element of the optical correction system; and
changing a distance between the first location and the pico projector, and correcting the image projection beam such that a corrected image is displayed at the first location when the image projection beam is reflected toward the first path, using a third corrective optic element of the optical correction system.

15. A method comprising:
generating an image projection beam, using a pico projector;
selectively reflecting the image projection beam toward one of a first path and a second path different than the first path, using a movable mirror system;
correcting the image projection beam such that a corrected image is displayed at a first location when the image projection beam is reflected toward the first path, using a first corrective optic element of an optical correction system;
correcting the image projection beam such that a corrected image is displayed at a second location different than the first location when the image projection beam is reflected toward the second path, using a second corrective optic element of the optical correction system; and
changing an incident angle between the first location and the image projection beam, and correcting the image projection beam such that a corrected image is displayed at the first location when the image projection beam is reflected toward the first path, using a fourth corrective optic element of the optical correction system.

* * * * *